United States Patent

[11] 3,570,537

[72] Inventor William M. Kelly
 61 Vista Street, Sans Souci, New South Wales, Australia
[21] Appl. No. 802,413
[22] Filed Feb. 26, 1969
[45] Patented Mar. 16, 1971

[54] MIXING TAP
 6 Claims, 4 Drawing Figs.
[52] U.S. Cl. .................................................. 137/625.15,
 137/454.2, 137/625.41, 137/625.47, 137/606
[51] Int. Cl. ...................................................... F16k 11/02
[50] Field of Search .......................................... 137/454.2,
 625.41, 625.46, 625.47, 625.5, 606

[56] References Cited
UNITED STATES PATENTS
1,832,723 11/1931 Mueller ......................... 137/606
3,090,396 5/1963 Rudelick ..................... 137/625.47X
FOREIGN PATENTS
1,304,189 8/1962 France .......................... 137/625.6

Primary Examiner—Harold W. Weakley
Attorney—McGlew and Toren

ABSTRACT: A mixing valve for mixing hot and cold water from separate supplies in which the flow of water to the valve outlet is controlled by two diagonally arranged O-rings which are mounted on a rotatable control spindle and sweep past separate hot and cold water inlet ports, the O-rings being separated by a portion of the spindle which is in sealing engagement with the wall of a bore in which the spindle is arranged whereby the effect of any difference in pressure in the hot and cold systems is minimized.

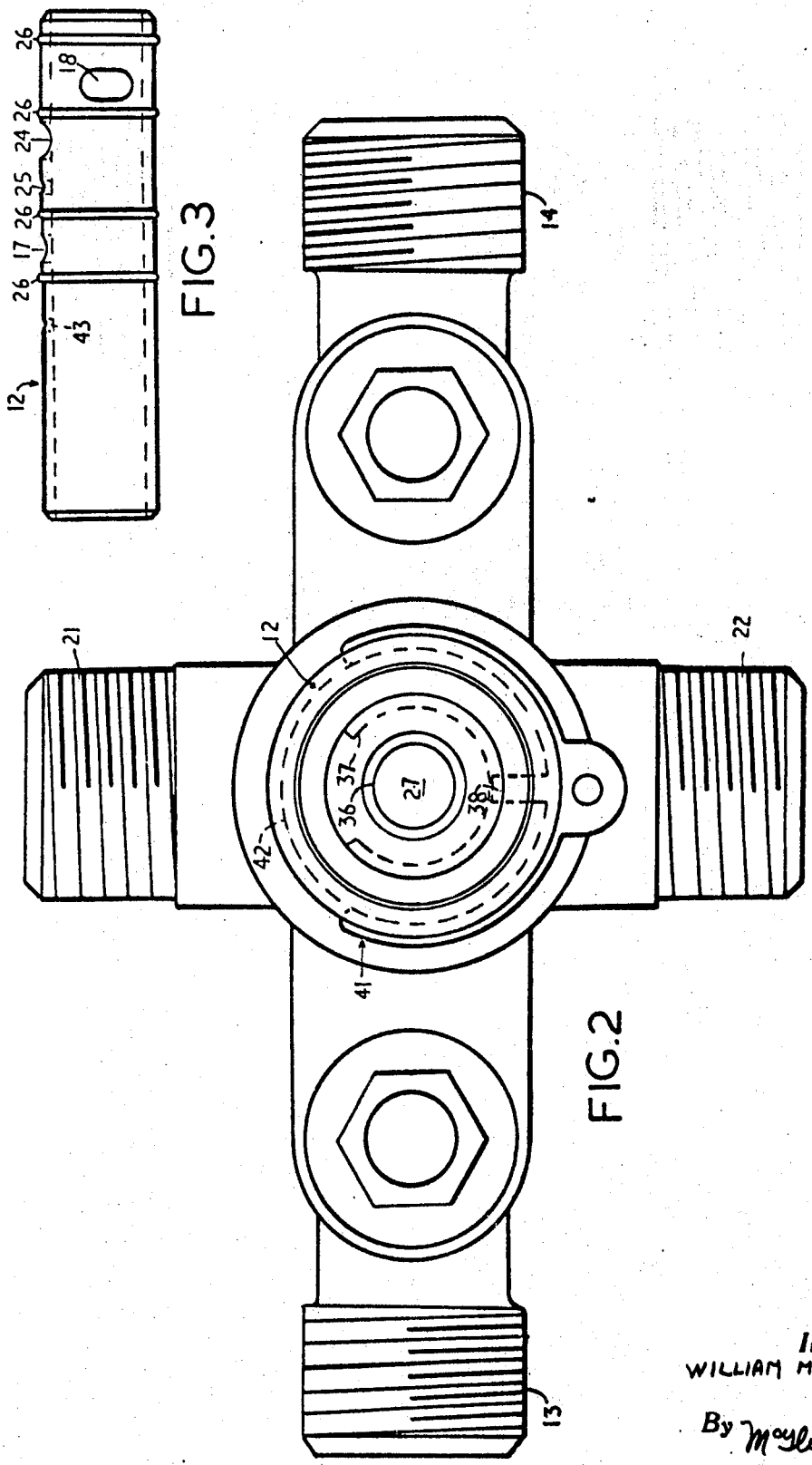

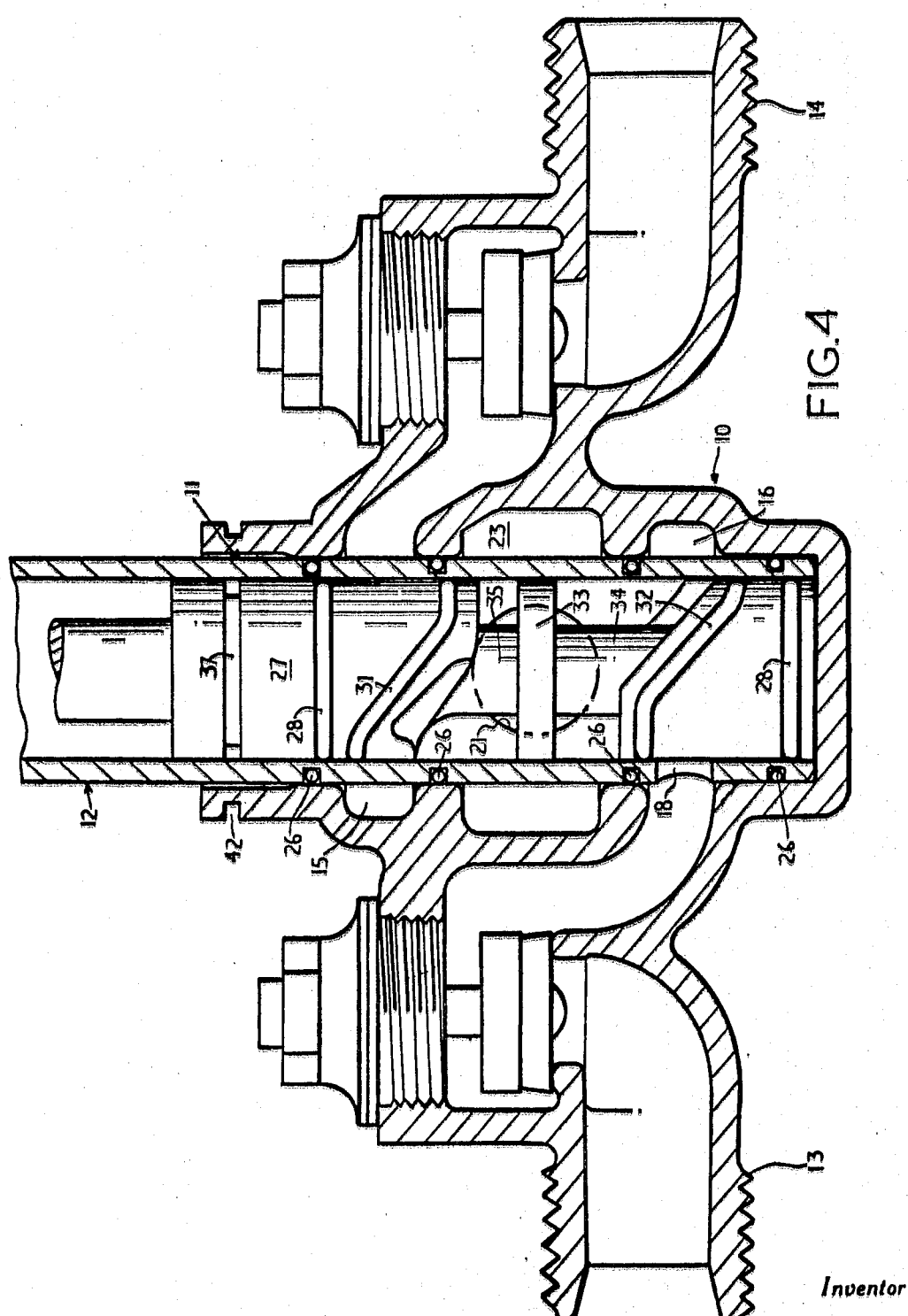

MIXING TAP

The present invention relates to a mixing valve for use in water supply systems.

The invention relates more particularly to a mixing valve for use in connection with hot and cold water supply systems by means of which either hot or cold water or a mixture of hot and cold water may be supplied from a single outlet and controlled by a single control handle.

A variety of problems occur in the design of mixing taps. Some of these arise from the necessity for providing a construction which is not only effective in use but which is simple and inexpensive to construct and free from trouble. Other difficulties arise from the fact that the water in the hot and cold water systems may be at markedly different pressures. Whereas cold water is normally supplied direct at mains pressure hot water may be supplied from a hot water tank providing a head of only a few feet.

The present invention provides a construction which enables many of the difficulties referred to above to be overcome satisfactorily and furthermore provides a mixing tap in which the full range from cold water to hot water may be covered by less than one turn of the control handle.

The invention consists in a mixing valve having a body with a substantially cylindrical bore, a control spindle being mounted within the bore for rotation about its axis, there being separate hot and cold water inlet apertures into the bore, and separate hot and cold water outlet apertures therefrom the outlets being arranged near the middle of the length of the bore an the inlets being spaced-apart on either side of the outlets or vice versa, there being arranged on the control spindle two O-rings the median planes of which lie at an acute angle to the axis of the cylinder, each O-ring being in sealing engagement with the bore and being arranged opposite an inlet aperture so that as the spindle is turned the O-ring sweeps across the aperture, the spindle being cut away over a portion of its length adjacent each O-ring, a portion of the spindle lying approximately midway between the two O-rings being directly or through an O-ring in sealing engagement with the bore, the body defining separate hot and cold water conduits to said inlet apertures and a combined water outlet conduit or separate conduits from said outlet apertures, the arrangement being such that by rotation of the control spindle the O-rings may be positioned relative to the inlet ports to permit the establishment of a flow of hot or cold water or a mixture thereof from them to the outlet ports.

In order that the nature of the invention may be better understood a preferred form thereof is hereinafter described, by way of example, with reference to the accompanying drawings in which:

FIG. 2 is a plan view of the body thereof;

FIG. 3 is a side elevation of the sleeve; and

FIG. 4 is a median sectional elevation of the mixing valve.

Figure 1:
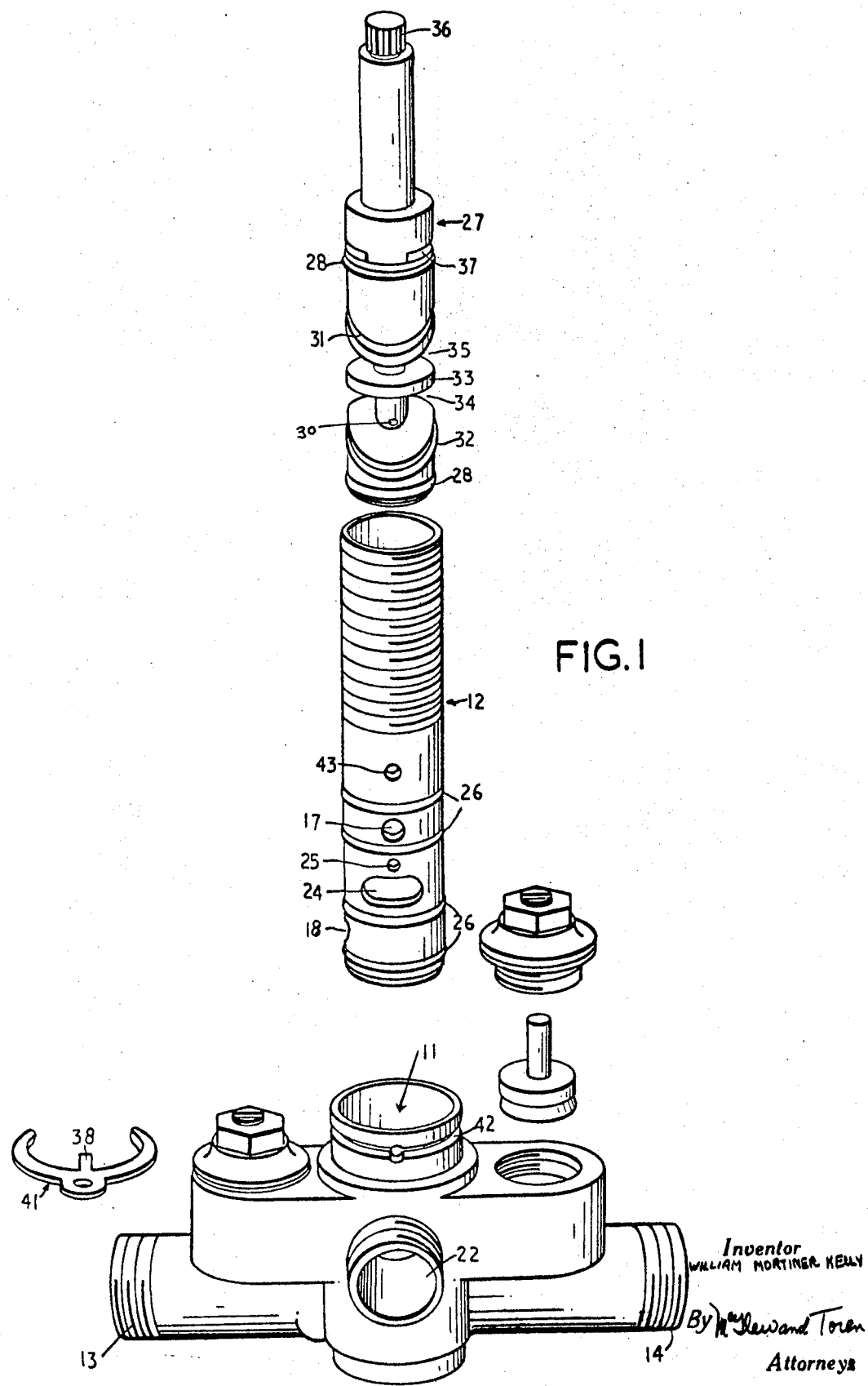
FIG. 1 is an exploded view showing the various parts of a mixing valve according to the invention.

In the preferred form of the invention the body 10 of the mixing valve is formed as a casting or a pressing and is provided with a central cavity 11 adapted to receive a separate sleeve 12 which contains the cylindrical bore referred to above. It is a matter of manufacturing convenience that the body and the sleeve are made separately.

The body is provided with separate hot and cold water inlet connections 13 and 14 which are for convenience arranged on opposite sides of the body and each is arranged to feed water via a suitable stop valve such as that shown to one side of the body cavity 11. In the present form of the invention hot water is directed to what will be referred to as the lower end of the body cavity 11 and cold water to the upper and although in practice the axis of the body cavity 11 will normally be horizontal. In each case the water is led into an annular passage 15 or 16 lying between the body and the sleeve, the upper annular passage connecting with an inlet aperture 17 passing into the bore of the sleeve and the lower annular passage connecting with a hot water inlet aperture 18 into the bore.

In this particular form of the invention the body is formed with water outlet connections 21 and 22 on either side arranged at right angles to the inlet connections 13 and 14 and these connect with a circular passage 23 arranged between the body and the sleeve into which the hot and cold water outlet apertures 24 and 25 respectively, from the bore are led. The object of having two outlet connections is to enable the mixing valve to be connected both to a bath outlet spout and a shower rose. The sleeve 12 is provided on its outer surface with O-rings 26 which are in sealing engagement with the surfaces on the interior of the body so that the three circular passages referred to above are isolated from each other and no water flow along the outside of the sleeve can take place.

The sleeve is provided near its upper end with the cold water inlet aperture 17 leading into the bore and near its lower end with a similar hot water inlet aperture 18. Between these there are provided the hot and cold water outlet apertures 24 and 25 which lead into the combined outlet connection. In practice the hot and cold water inlet and outlet apertures will not necessarily be of the same size particularly where as in the present case the mixing valve is intended for use in a system in which the hot water is supplied at a relatively low pressure in comparison with the pressure of the cold water supply.

A control spindle 27 fits closely within the bore of been 12 and is provided near its upper and lower ends with O-rings 28 which seal with the bore to prevent the escape of water in an upward or downward direction. The spindle is provided with two further grooves each accommodating an O-ring 31 and 32. These grooves are each arranged substantially in a plane making an acute angle with the axis of the spindle 27 and are arranged respectively opposite the hot and cold water inlet apertures 17 and 18 in the sleeve, the O-ring in each case being in sealing engagement with the bore of the sleeve. The portion of the control spindle lying between the two diagonal O-rings is cutaway except for a septum 33 lying substantially centrally between the two O-rings 31 and 32, which is in the form of a flange the circumference of which is in sealing engagement with the bore of the sleeve 12. It is not normally necessary to provide an O-ring at this point as any leakage past the septum 33 could take place only when the valve is in operation under which circumstances any pressure differential across the septum is likely to be very small.

The hole 30 in FIG. 1 is the opening of a passage connecting the lower end of the spindle with the lower cutaway portion and this is simply to facilitate assembly by permitting the escape of air trapped between the bottom of the spindle and the body 10.

The hot and cold water outlet apertures 24 and 25 are formed at positions in the sleeve 12 such that the hot water outlet aperture lies opposite the lower cutaway portion 34 on the control spindle and the cold water outlet aperture lies opposite the upper cutaway portion 35 of the control spindle.

When the mixing valve is in the closed position the arrangement is such that the upper diagonal O-ring 31 prevents water from passing into the bore of the sleeve 12 from the cold water inlet 17 and the lower diagonal O-ring 32 performs a like function in respect of the hot water inlet 18. If now the spindle is turned in an anticlockwise direction as seen from above, the upper diagonal O-ring 31 is moved past the cold water inlet aperture 17 and as it moves past this aperture water is permitted to enter the bore and flow into the cutaway portion 35 of the spindle and thence through the cold water outlet aperture 25 to the passage 23 and thence to the water outlet connections 21 and 22. In the first instance the hot water inlet aperture 18 remains sealed but as the spindle 27 is turned the lower diagonal O-ring 32 gradually passes over this aperture allowing hot water to flow into the lower cutaway portion 34 of the control spindle and thence to the outlet connections. It will be readily appreciated that the amount of hot or cold water allowed to enter will depend on the rotational position of the spindle 27 and that this can be adjusted so that either only cold water is admitted to the outlet connections or only hot water or a mixture of the two. In order to provide a smooth and satisfactory control of the water flow, the portion of the spindle lying between each diagonal O-ring 31 or 32 and the cutaway portion 35 or 34 is shaped so that the inlet apertures are uncovered at an appropriate rate which may be different at different stages in the opening or closing of the valve. For similar reasons the relative positions and shapes of the hot and cold inlet apertures 17 and 18 are chosen to give a desired rate of delivery from the apertures at different settings of the valve.

In operation of the valve it is desirable to ensure that a smooth control of the temperature of the water over the range of movement of the spindle is obtained and this is done in the present embodiment by shaping the parts of the spindle between each cutaway portion and the adjacent O-ring in the manner shown. The form of the shaping is decided empirically by trial and error and will vary with the size and shape of the inlet ports.

A point to be noted in connection with the construction described above is that the flow of water into the bore is controlled by the two diagonal O-rings 31 and 32. The effect of this is that water pressure is applied to each O-ring in such a way as to press into the groove in which it lies and by which it is supported. If the O-rings were used to control the outlet ports as they might be, the pressure would act on the O-rings in the opposite direction tending to force them into the ports with resulting damage when the valve spindle was rotated.

The spindle 27 is provided at one end with a splined portion 36 to which a suitable handle may be attached and a groove 37 which extends around the major portion of the circumference of the spindle and into which the end of a grub screw or other detent projects. This limits the rotational movement of the spindle to about 290°. In the construction shown the detent consists of a projection 38 on a C ring 41 which 290°. in the groove 42 in the body 10, the projection 38 passing through the hole 43 in the sleeve 12 into the groove 37 thus also holding the assembly in place in the body.

The embodiment of the invention described above is given by way of example only and a variety of different constructions within the scope of the invention as defined in the succeeding claims may be readily devised. It would, for example, be practicable to utilize a construction in which the two inlet apertures were in the middle of the bore with the two outlet apertures spaced-apart on either side of them, the conduits defined by the body being appropriately shaped, in such a construction it is preferred that the portion of the spindle corresponding to the septum described above should be provided with an "O" ring in view of the proximity of the inlet apertures.

I claim:

1. A mixing valve for hot and cold water comprising a body having a substantially cylindrical bore therein, an axially elongated control spindle rotatably mounted within and coaxial with said bore, said body having spaced hot and cold water inlet apertures communicating with the bore and spaced hot and cold water outlet apertures communicating with the bore and spaced from said hot and cold water inlet apertures, a pair of axially spaced O-rings extending about said spindle in sealing engagement with said bore, each said O-ring disposed in a plane arranged at an acute angle to the axis of said spindle, one of said O-ring located on said spindle opposite said hot water inlet and extending in the direction of the axis of said spindle for at least the axial extend of said hot water inlet and the other said O-ring located on said spindle opposite said cold water inlet and extending in the direction of the axis of said spindle for at least the axial extend of said cold water inlet so that as said spindle is rotated within said bore said O-rings sweep across the respective inlets, said spindle is cutaway for a portion of its axial length adjacent each said O-ring, means for forming a seal between said spindle and said bore intermediate said O-rings for preventing any mixing of the hot and cold water flowing into said bore through said body, said body and control spindle forming separate hot and cold water passageways through said body and bore to said hot and cold water outlet apertures, said mixing valve arranged so that by rotation of said control spindle and said O-rings can be positioned relative to the inlet apertures to permit the establishment of a flow of at least one of hot and cold water to the respective outlet apertures.

2. A mixing valve, as set forth in claim 1, wherein said body comprises a body member having an opening therethrough a removable sleeve positioned in closely fitting relationship with the opening and forming said cylindrical bore, and means for effecting a seal between said body member and said sleeve for preventing any leakage of the hot and cold water flowing through the body member into and out of said bore therethrough.

3. A mixing valve, as set forth in claim 1, wherein said control spindle comprises an axially elongated first part arranged to be positioned within said body and an axially elongated second part extending axially from said first part exteriorly of said body, said second part arranged to receive means for rotating said control spindle, a portion of said first part disposed in closely fitting relationship with said bore in said body, said first part is cutaway for a portion of its axial length intermediate its ends for providing an annular open space within said bore intermediate said O-rings; an annular septum extending transversely of said control spindle and positioned intermediate the ends of said cutaway portion for dividing said cutaway portion into a pair of separate annular chambers, said septum extending into sealing engagement with the interior surface of said bore, and means engageable with said first part of said control spindle for limiting the extend of rotational movement thereof within said bore.

4. A mixing valve for hot and cold water comprising a body having a substantially cylindrical bore therein, an axially elongated control spindle rotatably mounted within and coaxial with said bore, said body having spaced hot and cold water inlet apertures communicating with said bore and spaced hot and cold water outlet apertures communicating with said bore and spaced from said inlet apertures, said outlet apertures being arranged intermediate said inlet apertures and said hot water inlet aperture being positioned adjacent said hot water outlet aperture and said cold water inlet aperture being positioned adjacent said cold water outlet aperture, a pair of axially spaced O-rings extending about said spindle in sealing engagement with said bore, each said O-ring disposed in a plane arranged at an acute angle to the axis of said spindle, one of said O-rings located on said spindle opposite said hot water inlet and extending in the direction of the axis of said spindle for at least the axial extent of said hot water inlet and the other said O-ring located on said spindle opposite said cold water inlet and extending in the direction of the axis of said spindle for at least the axial extent of said cold water inlet so that as said spindle is rotated within said bore said O-rings sweep across the respective inlets, said spindle is cutaway for a portion of its length between said o-rings, an annular septum secured to and extending transversely of said control spindle divides the cutaway portion of said spindle into separate annular chamber, said septum disposed in sealing engagement with said bore for preventing any mixing of the hot and cold waters flowing into the annular chambers formed by the cutaway portions of said control spindle, said body and control spindle forming separate hot and cold water passageways through said body and bore to said hot and cold water outlet apertures, and said mixing valve arranged so that by rotation of said control spindle said O-rings can be positioned relative to the inlet apertures to permit the establishment of a flow of at least one of hot and cold water to the respective outlet apertures.

5. A mixing valve, as set forth in claim 4, wherein said body comprises a body member having an opening therethrough, a removable sleeve positioned in closely fitting relationship with the opening and forming said cylindrical bore, and means for effecting a seal between said body base and said sleeve for preventing any leakage of the hot and cold water flowing through the body member into and out of said bore therethrough.

6. A mixing valve, as set forth in claim 4, wherein said control spindle comprises an axially elongated first part arranged to be positioned within said body and an axially elongated second part extending axially from said first part exteriorly of said body, said second part arranged to receive means 2 rotating said control spindle, a portion of said first part disposed in closely fitting relationship with said bore in said body, said first part is cutaway for a portion of its axial length intermediate its ends for providing an annular open space within said bore intermediate said O-rings, and means engageable with said first part of said control spindle for limiting the extent of rotational movement thereof within said bore.